UNITED STATES PATENT OFFICE.

JOHN H. FILBERT, OF BALTIMORE, MARYLAND.

ART OF IMPROVING THE ODOR OF VEGETABLE OILS.

No. 929,345.

Specification of Letters Patent.

Patented Aug. 3, 1909.

Application filed July 3, 1903. Serial No. 441,860.

*To all whom it may concern:*

Be it known that I, JOHN H. FILBERT, a citizen of the United States, residing at Baltimore, in the State of Maryland, have invented certain new and useful Improvements in the Art of Improving the Odor of Vegetable Oils, of which the following is a specification.

This invention relates to the art of improving the odor of oils.

The oil produced from cotton-seed enters largely into various food compounds, such as lard compound. When cotton-seed oil, or any "compound" having cotton-seed oil as one of the principal ingredients, is heated in a pan in the manner that hog's lard is commonly heated in a frying pan, an odor is developed that is objectionable. This odor is characteristic of the cotton-seed oil, and is always noticeable when heat is applied to the oil or to the food article that contains this oil. On the other hand it is well known that certain animal fats and oils, such as hog's lard and beef fat, do not develop objectionable odors when heat is applied at the time of cooking.

In rendering hog fat in the open kettle process to produce lard about 280 degrees F. of heat may be safely used without burning; at this temperature it has been found that any bacteria or micro-organisms contained in the animal fat will be destroyed. In this "rendering" operation the particles of animal tissue in the fat is the first to be affected, and this tissue at the temperature named becomes slightly brown, and rises to the surface from which it may be skimmed. When a suitable quantity of this browned animal tissue has been collected, it is put in a press while hot, and the lard is expressed from it, and the caked mass of animal tissue left in the press as residuum, constitutes what is known as "crackling." At the present time the known uses to which crackling is put are as a cheap material in soap-making, as a material in the manufacture of fertilizer, as an ingredient in making poultry food.

I have found that the fresh or newly-produced animal "crackling" contains in large measure the essence or flavoring material that gives character to the lard or rendered animal fat,—for instance, the hog crackling contains the flavoring essence that is recognized by the olfactory sense when pure, sweet lard is heated in a frying pan.

An object of this invention is to provide a process for improving the natural odor or flavor of vegetable oil, such as cotton-seed and other oil suitable for food uses, by imparting to it the odor or flavor characteristic of fresh animal crackling.

The inventive idea involved in my present invention is to utilize the essence, odor or flavor that resides in what is known as animal "crackling" to improve the odor of vegetable oil. By the process hereinafter described the vegetable oil will take up, assimilate, and become imbued with the more pleasant and more desirable essence, odor or flavor of animal crackling, and thus the vegetable oil will be freed of the objection to it that has hitherto arisen when the odor is developed by heat at the time of cooking.

In carrying out the process with heat I take advantage of the fact that vegetable oil, such as cotton-seed oil, will stand a higher degree of heat without burning or becoming discolored, than rendered fat of either the hog or beef.

I deem it the better course, but not essential, to prepare the hard, caked mass of "crackling" that comes from the press, by breaking it up and grinding it in a suitable mill. When ground the crackling will have a somewhat similar appearance to finely ground roasted coffee.

With these explanations, a description of the process will now be made.

Any quantity of the vegetable oil may be treated at a time, depending on the apparatus or the facilities at hand. It will be assumed, for the purposes of illustration and this description, that one hundred pounds of cotton-seed oil is the quantity to be treated; the process is as follows: The cotton-seed oil, or other vegetable oil, is put in a suitable vessel preferably one to which heat may be applied; the exact degree of temperature is not essential, but the vegetable oil must not be heated high enough to burn; it may safely be heated to from 350 to 380 degrees F. Of course where heat is used a thermometer should be employed. Fresh, sweet animal crackling is added by sprinkling or otherwise immersing it into the oil,—a suitable proportion of the crackling I have found to be about five per cent. by weight, that is to say, where 100 pounds of vegetable oil is being treated about 5 pounds of animal crackling may be used. Of course the proportions of oil and crackling may be varied somewhat according to the judgment of the operator. The heat, if used, may be applied to the oil before the crackling is added, or the crackling may be added to the oil and the heat applied afterward. When the heated oil has reached the temperature desired, not exceeding 350 to 380 degrees F. the heat should be cut off. While the crackling is being added the oil may be agitated to thoroughly distribute the crackling throughout the mass of oil, but this is a matter for judgment on the part of the operator. After the vegetable oil and crackling have been together a short period, say five or ten minutes where the highest degree of heat here named has been employed, the blending may be considered as completed, and the next step in the process is the separation of the crackling from the oil. Where this separation is to be effected by filtration the hot oil and crackling should be transferred to a filter to remove the crackling and leave the cotton-seed oil perfectly clear, and changed only in respect to the odor. The flavoring of oil with the essence of the animal crackling does not increase the weight or bulk of the oil. When finished the cotton-seed oil will have the agreeable odor of sweet-fresh animal crackling, and may be used for any food articles, such as the so-called lard compound. Whenever this improved oil, or any food compound containing the improved cotton-seed oil, is subjected to heat in a frying pan, or otherwise, it will develop the same odor or flavor as that from heated fresh hog's lard, or heated fresh beef-fat, as the case may be.

While the process as described to this point employs heat, it is to be understood that heat is not essential and may be dispensed with; if heat is not employed to promote the process then the period of time for keeping the vegetable oil and animal crackling together to effect the blend should be considerably extended according to the limpidity of the oil.

In the process as hereinbefore described the step for separating the oil and crackling is filtration, but this step and the desired separation may be effected without filtering by merely allowing the oil to stand until the particles of crackling precipitate, and then drawing off the clear oil. The appended claims should therefore be read with this distinct understanding.

What has here been stated with reference to hog "crackling" as affecting and improving the odor of cotton-seed oil, or other vegetable oil, is also true of beef crackling. The process, when using beef crackling, would be the same as hereinbefore described for hog crackling, and the result of improving the odor would be substantially the same—the only difference in the result would be that the beef crackling would give to the vegetable oil the odor or flavor characteristic of rendered beef fat.

The terms "essence, odor or flavor" have been used in the specification to describe the characteristics of the animal crackling with which the vegetable oil becomes imbued; all of the three words now referred to are meant to describe the same desirable properties of the crackling.

The improved cotton-seed oil may be used for the production of any food product or food compound, and when either the oil or compound is heated the objectionable odor of cotton-seed will not be perceptible in a degree that is objectionable.

It will be understood that the essential idea of this invention is to impart to cotton-seed oil, and other vegetable oils, the essence, odor or flavor characteristic of fresh animal crackling, and that the steps herein described of mixing with the oil whether heated or not, fresh animal crackling, and then separating the oil and crackling, is one of perhaps several ways in which the desired end may be accomplished.

Having thus described my invention what I claim and desire to secure by Letters Patent is,—

1. The process of improving cotton-seed oil, consisting of mixing with the oil fresh animal crackling so as to imbue the oil with the essence, odor or flavor residing in the crackling, then separating the oil and crackling.

2. The process of improving the odor of vegetable oil consisting of heating the vegetable oil in a suitable vessel to a temperature less than that at which the oil would burn, and mixing or immersing in the heated oil animal crackling so as to imbue the said oil with the essence, odor or flavor of the crackling.

3. The process of treating vegetable oil consisting of heating the vegetable oil in a suitable vessel; mixing or immersing in the oil animal crackling, then filtering the oil to remove the said crackling.

4. The process of improving cotton-seed oil, consisting of mixing with the oil fresh hog-crackling; having the oil in a heated condition during at least a part of the period that the crackling is mixed with it, and finally separating the oil from the crackling, whereby the oil is imbued with the odor characteristic of heated fresh hog's lard.

5. The process of treating vegetable oil, consisting of heating the oil, and then imparting to the heated oil the essence, odor or flavor of fresh animal crackling.

In testimony whereof I affix my signature in presence of two witnesses.

JOHN H. FILBERT.

Witnesses:
   CHARLES B. MANN, Jr.,
   G. FERDINAND VOGT.